United States Patent
Ochiai et al.

[11] Patent Number: 5,971,068
[45] Date of Patent: Oct. 26, 1999

[54] METHOD AND SYSTEM FOR TEMPERATURE CONTROL OF HYDRAULIC OIL

[75] Inventors: Akira Ochiai; Kazuo Nagashima; Chikara Watanabe; Haruhiko Kikuchi, all of Shizuoka-ken, Japan

[73] Assignee: Toshiba Kikai Kabushiki Kaisha, Tokyo, Japan

[21] Appl. No.: 08/792,235

[22] Filed: Jan. 31, 1997

[30] Foreign Application Priority Data

Feb. 2, 1996 [JP] Japan ............................ PO8-017844

[51] Int. Cl.$^6$ ............................................. G05D 23/00
[52] U.S. Cl. ..................... 165/290; 165/293; 165/299; 165/300; 165/253; 184/6.22
[58] Field of Search .................... 165/290, 293, 165/299, 300; 184/6.22

[56] References Cited

U.S. PATENT DOCUMENTS

| | | | |
|---|---|---|---|
| Re. 31,903 | 6/1985 | Failace | 165/290 |
| 2,396,053 | 3/1946 | McEntire | 165/293 |
| 2,449,696 | 9/1948 | Geddes et al. | 165/293 |
| 3,480,076 | 11/1969 | Tomita | 165/254 |
| 3,768,545 | 10/1973 | Wills | 165/290 |
| 4,031,950 | 6/1977 | Shultz | 165/293 |
| 4,066,365 | 1/1978 | Staunton | 165/290 |
| 4,922,996 | 5/1990 | Rees | 165/293 |
| 5,323,961 | 6/1994 | Hurmi | 165/290 |

*Primary Examiner*—Carl D. Price
*Assistant Examiner*—Terrell McKinnon
*Attorney, Agent, or Firm*—Finnegan, Henderson, Farabow, Garrett & Dunner, L.L.P.

[57] ABSTRACT

A combination of setting a correction value of an atmospheric temperature for each temporal section in response to a predicted value of a variation of the atmospheric temperature in a day and a delayed variation of a temperature of hydraulic oil due to thermal inertia and correcting a command value for a temperature regulation of the hydraulic oil at a supply source of the hydraulic oil in response to the correction value of the atmospheric temperature, performing a feed forward compensation of the temperature of the hydraulic oil with respect to the variation of the atmospheric temperature for the day as a cyclic period, permits a working body of hydraulic oil to be kept at an adequate temperature, even under working conditions subjected to significant influences of atmospheric temperature variations and thermal inertia.

16 Claims, 3 Drawing Sheets

METHOD AND SYSTEM FOR TEMPERATURE CONTROL OF HYDRAULIC OIL

BACKGROUND OF THE INVENTION

1. Field of the Invention

The present invention relates to a hydraulic oil temperature control method and a hydraulic oil temperature control system, and particularly, it relates to a method and a system for a temperature control of hydraulic oil applicable such as to a body of cooling oil or lubricating oil for a static pressure bearing as well as a spindle such as of a large-scaled machine tool or industrial machine that has a supply place of hydraulic oil distant from the place of use.

2. Description of Relevant Art

As a temperature control method of hydraulic oil applicable such as to a body of cooling oil or lubricating oil for a static pressure bearing as well as a spindle such as of a machine tool or industrial machine, there is known an adaptive control method that includes measuring an actual machine temperature or room temperature by a temperature sensor, and employing the results for regulating an oil temperature to have a viscosity of hydraulic oil adapted for the machine temperature or room temperature.

Such a conventional adaptive control method presumes an effective machine temperature or room temperature to be always measurable.

In other words, there is a presumption that influences should be neglectable in respect of variations of atmospheric temperature after a regulation of oil temperature as well as a delay in variation of oil temperature due to thermal inertia associated such as with a machine tool or industrial machine.

It therefore is difficult to keep a body of hydraulic oil at an adequate temperature in use such as for a static pressure bearing as well as a spindle such as of a large-scaled machine tool or industrial machine that has a supply place of hydraulic oil distant from the place of use.

One may exemplarily suppose a large-scale astronomical telescope for which an observation dome stands on a summit of a mountain, and a control house is built at a side of the mountain, as the control house is a site for placing a supply source of hydraulic oil, where a body of hydraulic oil is temperature-regulated, and the temperature-regulated body of hydraulic oil is transferred by an outdoor pipeline to a static pressure bearing of the astronomical telescope, consuming time for the transfer, so that no artisan can ignore influences due to atmospheric temperature variations and associated thermal inertia, suffering the difficulty of remote-controlling the transferred body of hydraulic oil at an adaptive temperature for use or work in the static pressure bearing.

SUMMARY OF THE INVENTION

The present invention has been achieved with such points in mind.

It therefore is an object of the present invention to provide a method and a system for a temperature control of hydraulic oil, permitting a working body of hydraulic oil to be kept at an adequate temperature, even when subjected to influences of atmospheric temperature variations and thermal inertia.

To achieve the object, according to a first aspect of the invention, there is provided a control method of a temperature of hydraulic oil, comprising the steps of setting a correction value of an atmospheric temperature for a respective temporal section in response to a predicted value of a variation of the atmospheric temperature in a day and a delayed variation of the temperature of the hydraulic oil due to thermal inertia, and correcting a command value for a temperature regulation of the hydraulic oil at a supply source of the hydraulic oil by the correction value of the atmospheric temperature, performing a feed forward compensation with respect to the variation of the atmospheric temperature for the day as a cyclic period.

According to the first aspect, a body of hydraulic oil has at its supply source a regulated temperature including a component covering a predicted variation of atmospheric temperature in a day and a delayed variation of oil temperature due to thermal inertia.

Accordingly, it is permitted for a working body of hydraulic oil to be kept at an adequate temperature, even when subjected to influences of atmospheric temperature variations and thermal inertia.

According to a second aspect of the invention, as it depends from the first aspect, the control method includes calculating the correction value of the atmospheric temperature by using a trigonometric function with respect to time as a variable.

According to the second aspect, a correction value of an atmospheric temperature is calculatable in a facilitated manner using an elementary function generator that generates a trigonometric function such as a cosine function representative the atmospheric temperature.

Further, to achieve the object, according to a third aspect of the invention, there is provided a control system of a temperature of hydraulic oil, comprising a temperature regulator for performing a temperature regulation of the hydraulic oil at a supply source of the hydraulic oil, atmospheric temperature setting means for setting a correction value of an atmospheric temperature for a respective temporal section in response to a predicted value of a variation of the atmospheric temperature in a day and a delayed variation of the temperature of the hydraulic oil due to thermal inertia, and oil temperature regulation control means for controlling a state of the temperature regulation by the temperature regulator such that a command value for the temperature regulation of the hydraulic oil is corrected by the correction value of the atmospheric temperature set by the atmospheric temperature setting means, and the hydraulic oil has a temperature regulated to the corrected command value.

According to the third aspect also, a body of hydraulic oil has at its supply source a regulated temperature including a component covering a predicted variation of atmospheric temperature in a day and a delayed variation of oil temperature due to thermal inertia, thus permitting a working body of hydraulic oil to be kept at an adequate temperature, even when subjected to influences of atmospheric temperature variations and thermal inertia.

According to a fourth aspect of the invention, as it depends from the third aspect, the oil temperature regulator comprises a heat exchanger of a forced circulation type in which the hydraulic oil to be temperature-regulated is supplied by a hydraulic oil supply pump from a reservoir of the supply source of the hydraulic oil, and coolant is supplied by a coolant supply pump, and the oil temperature regulation control means controls a state of the temperature regulation by the heat exchanger by controlling a flow rate of the hydraulic oil to be supplied to the heat exchanger in response to the command value.

According to the fourth aspect, a temperature regulation of hydraulic oil is achieved in a quantitative manner by a flow control of a body of hydraulic oil to be supplied to a heat exchanger, in addition to that the hydraulic oil in a reservoir is circulated in a system including the heat exchanger, so that it is well stirred, with an improved temperature uniformity and a favorable temperature regulation of hydraulic oil.

According to a fifth aspect of the invention, as it depends from the third or the fourth aspect, the control system further comprises a collecting reservoir for collecting the hydraulic oil, as it is discharged from a hydraulic device, where it has been used, a hydraulic oil return pump for returning the hydraulic oil from the collecting reservoir to the supply source of the hydraulic oil, a temperature sensor for detecting an oil temperature of the hydraulic oil, and hydraulic oil return flow control means for controlling the hydraulic oil return pump to a reduced number of revolutions in response to a reduction of the oil temperature detected by the temperature sensor According to the fifth aspect, a return pump of hydraulic oil has a reduced number of revolutions in accordance with a reduction of oil temperature detected by an oil temperature sensor and hence with an increase of the viscosity of hydraulic oil that depends on the oil temperature, so that a returning body of hydraulic oil has a decreased flow rate in correspondence to the increase in viscosity, allowing the pump to have a reduced drive load.

When the viscosity of hydraulic oil is high, an effluent body of hydraulic oil such as at a static pressure bearing has a decreased flow rate, causing a pumping flow at a supply source reservoir of the hydraulic oil to decrease accordingly. For a high viscosity of hydraulic oil, therefore, a reduced number of revolutions to drive the hydraulic oil return pump reduces the flow rate of hydraulic oil returning from a collection reservoir to the supply source reservoir, where the hydraulic oil is thus permitted to have a level suppressed of variation. It therefore is avoidable for the supply source reservoir to have an undue quantity of low-temperature hydraulic oil inflowing thereto. As a result, a reserved body of hydraulic oil in the supply source reservoir has a controlled temperature with a suppressed variation.

Still more, to achieve the object, according to a sixth aspect of the invention, there is provided a temperature control method of hydraulic oil, comprising: a first step of supplying to a first place a body of the hydraulic oil with a first oil temperature; a second step of performing within a necessary time the steps of transferring the supplied body of the hydraulic oil to a second place distant from the first place, and having the transferred body of the hydraulic oil working, before taking out with a second oil temperature; and a third step of performing a temperature control of the working body of the hydraulic oil by a feed forward control in parallel with the first and the second step, the third step comprising repeating the steps of having a first control value for a regulation of the first oil temperature at a first time point within a first unit time to keep the working body of the hydraulic oil at an adequate temperature, having an atmospheric temperature of the second place, as it is predicted for a second time unit including a second time point at which the necessary time has elapsed from the first time point, determining a second control value by compensating the first control value in response to the atmospheric temperature, determining a third control value by compensating the second control value in response to a measurement data of the second oil temperature in the first time unit, and performing the regulation of the first oil temperature at the first time point by employing the third control value.

According to the sixth aspect, in respect of a series of dispersed, continuous or partially overlapping time units or sections, there are concerned a first time unit that includes an arbitrary first time point and a second time unit that includes a second time point having elapsed a necessary time from the first time point. Then, to effect a regulation at the first time point with respect to temperature of a body of hydraulic oil to be supplied to a first place, there is set a first control value, which is compensated in accordance with a predicted value of an atmospheric temperature in the second time unit at a second place distant from the first place, to provide a second control value. Accordingly, each time unit may have a narrowed width in correspondence to an average speed of change in atmospheric temperature at the second place, for a direct use of the second control value to effect the regulation of oil temperature, so that a body of hydraulic oil regulated at least to a temperature substantially copable with an atmospheric temperature variation at the second place may be effectively used in the second place by the second time point at the latest.

Further, according to the sixth aspect, a body of hydraulic oil used in the second place has its temperatures measured at voluntary time points in a repeated occurrence of the first time unit to provide a set of measured data, of which a processable subset is processed till a first time point in that occurrence of the first time unit, with a resultant data, by which the second control value is compensated to provide a third control value, which is employed in an applicable manner to perform the regulation of oil temperature at the first time point.

Such a processing is executed in a repetitive manner, e.g. every one of time slots having a very small width in comparison with the time unit. Accordingly, at a second time point in a repeated occurrence of the second time unit, the temperature control has a converged state, covering an actual total of influences due to thermal inertia of associated equipment.

According to a seventh aspect of the invention, as it depends from the sixth aspect, the hydraulic oil transferred to the second place in the second step has a third oil temperature, and the employing the third control value in the third step includes determining a fourth control value by compensating the third control value in response to a measurement data of the third oil temperature in the first time unit, and employing the fourth control value.

According to the seventh aspect, it is permitted for the temperature control to be effected in consideration of both an influence of thermal inertia associated with transfer of hydraulic oil and that of thermal inertia associated with use of hydraulic oil, allowing a flexible coping with variations of weather around a hydraulic oil transfer line.

According to an eighth aspect of the invention, as it depends from the sixth aspect, the feed forward control is performed at the first place. It therefore is unnecessary to manage to overcome difficulties due to geographical conditions of a second place where a temperature-regulated body of hydraulic oil is transferred to be used, from a first place where the hydraulic oil is temperature-regulated. If the second place is unfavorable to access, one may select as the first place a voluntary place relatively easy of an access, permitting a facilitated temperature control.

According to a ninth aspect of the invention, as it depends from the sixth aspect, the temperature control method further comprises a fourth step of returning to the first place a body of the hydraulic oil taken out with the second oil temperature. Therefore, a body of hydraulic oil can be recirculated.

Yet more, to achieve the object, according to a tenth aspect of the invention, there is provided a temperature control system of hydraulic oil, comprising: a supply source provided at a first place for supplying a body of the hydraulic oil with a first oil temperature; a piping system for transferring the supplied body of the hydraulic oil to a second place distant from the first place, taking a necessary time; a hydraulic device provided at the second place for having the transferred body of the hydraulic oil working, before taking out with a second oil temperature; and control means for performing a temperature control of the working body of the hydraulic oil by a feed forward control, the control means being operative for repeating having a first control value for a regulation of the first oil temperature at a first time point within a first unit time to keep the working body of the hydraulic oil at an adequate temperature, having an atmospheric temperature of the second place, as it is predicted for a second time unit including a second time point at which the necessary time has elapsed from the first time point, determining a second control value by compensating the first control value in response to the atmospheric temperature, determining a third control value by compensating the second control value in response to a measurement data of the second oil temperature in the first time unit, and performing the regulation of the first oil temperature at the first time point by employing the third control value.

According to an eleventh aspect of the invention, as it depends from the tenth aspect, the hydraulic oil transferred to the second place by the piping system has a third oil temperature, and the employing the third control value by the control means includes determining a fourth control value by compensating the third control value in response to a measurement data of the third oil temperature in the first time unit, and employing the fourth control value.

According to a twelfth aspect of the invention, as it depends from the tenth aspect, the feed forward control is performed at the first place.

According to a thirteenth aspect of the invention, as it depends from the tenth aspect, the temperature control system further comprises a piping system for returning to the first place a body of the hydraulic oil discharged from the hydraulic device.

According to the tenth to the thirteenth aspect, there can be achieved functions and effects corresponding to the sixth to the ninth aspect, respectively.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
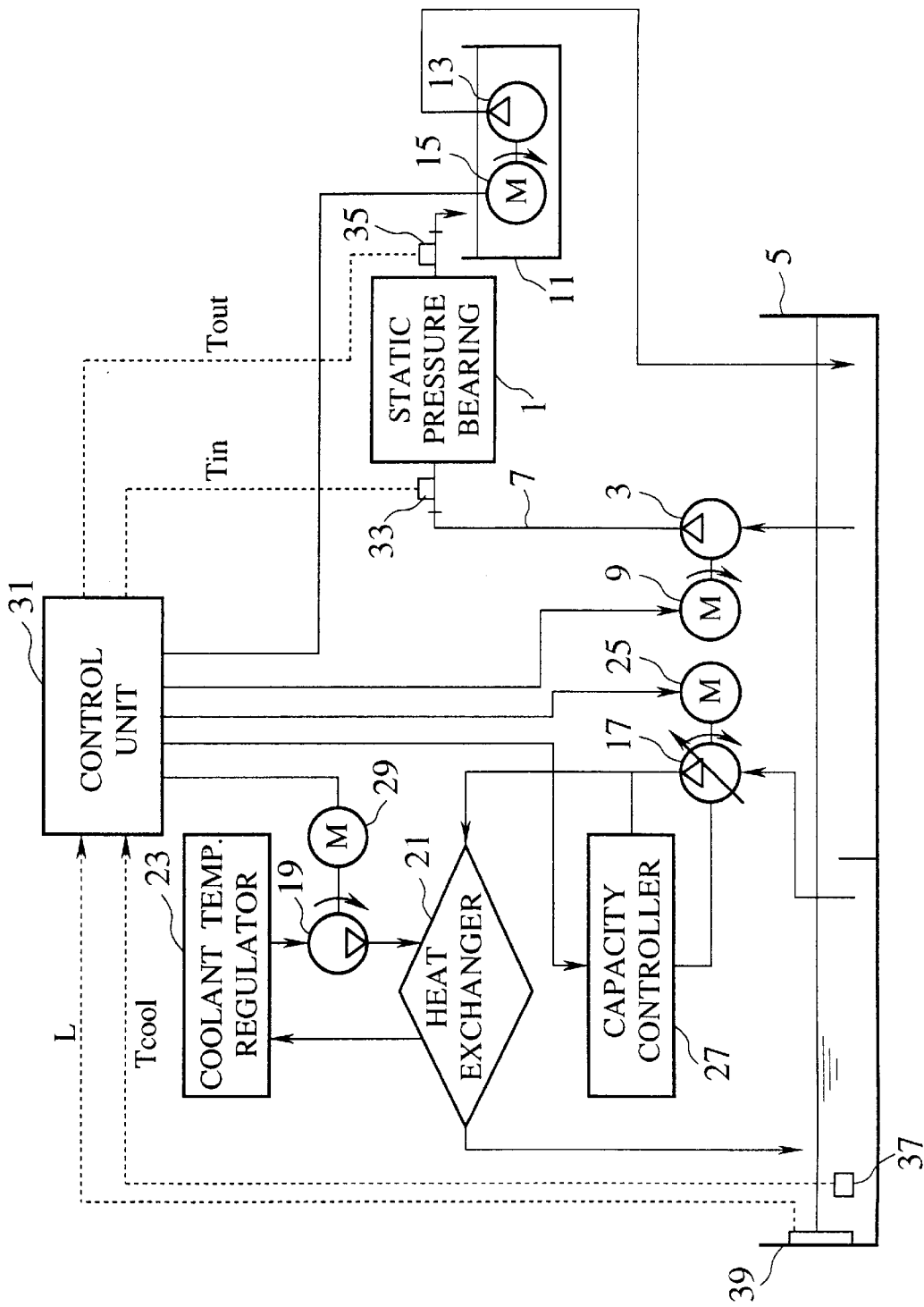
FIG. 1 is a block diagram of a hydraulic oil circuit for a static pressure bearing, as an embodiment of a temperature control system according to the invention.

There will be detailed below the preferred embodiments of the present invention with reference to the accompanying drawings. Like members are designated by like reference characters.

FIG. 1 shows a hydraulic oil circuit for a static pressure bearing, as an embodiment of a temperature control system according to the invention. In FIG. 1, designated at reference character 1 is the static pressure bearing. The static pressure bearing 1 is supplied with hydraulic oil of a predetermined pressure, as it is pumped by a main pump 3 from a hydraulic oil supply source reservoir 5 and transferred by a relatively long hydraulic oil supply line 7. The main pump 3 is a hydraulic pump of an electrically driven type driven by a motor 9.

A collection reservoir 11 collects hydraulic oil effluent from the static pressure bearing 1 after the use. The collected hydraulic oil in the reservoir 11 is returned by a hydraulic return pump 13 to the hydraulic oil supply source reservoir 5. The hydraulic oil return pump 13 is a hydraulic pump of an electrically driven type driven by a motor 15, such that both pump 13 and motor 15 are entirely submerged in a body of hydraulic oil contained in the collection reservoir 11.

The motor 15 may thus be placed together with the hydraulic oil return pump 13 in an installation room of the static pressure bearing 1, without causing heat of the motor 15 to be directly convected within the installation room of the static pressure bearing 1, effectively suppressing temperature variations that otherwise might have been caused by heat liberation of the motor in the room. The installation room of the static pressure bearing 1 may be an observation dome for a large-scale astronomical telescope. In this case, it is avoidable for a body of air in the observation dome to sway due to heat of the motor.

The hydraulic oil circuit for static pressure bearing includes, as an oil temperature regulator for a temperature regulation of hydraulic oil at a hydraulic oil supply source, a heat exchanger 21 of a forced circulation type to which a body of hydraulic oil to be temperature-regulated is supplied by a hydraulic oil supply pump 17 from the hydraulic oil supply source reservoir 5, and a body of coolant is supplied by a coolant supply pump 19.

The coolant is regulated to a predetermined temperature by a coolant temperature regulator 23, and is circulated in a close-loop circuit including the heat exchanger 21 and the coolant temperature regulator 23.

The hydraulic oil passes through the heat exchanger 21, where it is temperature-regulated by heat exchange with the coolant, and returns to the hydraulic oil supply source reservoir 5.

The hydraulic oil supply pump 17 comprises a capacity-variable hydraulic pump of an electrically driven type, such as a swash plate type piston pump, driven for rotation by a motor 25, such that a delivery capacity is set by a capacity controller 27 in a variable manner. The hydraulic oil passing the heat exchanger 21 has a flow rate quantitatively controlled by the delivery capacity of the hydraulic oil supply pump 17.

The coolant supply pump 19 comprises a hydraulic pump of a constant capacity type driven by a motor 29. The coolant supplied to the heat exchanger 21 by the coolant supply pump 19 may have a constant flow rate.

Respective operations of the motors 9, 15, 25 and 29 and capacity control actions of the capacity controller 27 are governed by a control unit 31 of a computer type.

The control unit 31 receives from an inlet temperature sensor 33 an input signal representing a temperature Tin of hydraulic oil just before entering the static pressure bearing 7, from an outlet temperature sensor 35 an input signal representing a temperature Tout of hydraulic oil discharged from the static pressure bearing 1, from a reservoir temperature sensor 37 an input signal representing a temperature Tcool of hydraulic oil in the hydraulic oil supply source reservoir 5, and from a level sensor 39 an input signal representing a surface level L of the hydraulic oil in the hydraulic oil supply source reservoir 5, and processes them to output command signals to the motors 9, 15, 25 and 29 and the capacity controller 27, following a program taking into account their operation and control characteristics.

On the motor 15 of the hydraulic oil return pump 13, there is imposed a controlled voltage such as by an inverter control to thereby variably control the number of drive revolutions for the return pump 13.

The control unit 31 can thus serve as a hydraulic oil return flow control means for reducing an imposed voltage to the motor 15 in accordance with a reduction of the hydraulic oil temperature Tin measured by the inlet temperature sensor 33, in a reversible manner.

As a result, the hydraulic oil return pump 13 has a decreased number of revolutions in accordance with a reduction of the oil temperature measured by the inlet temperature sensor 33, i.e., in response to an increase of the viscosity of hydraulic oil that depends on the oil temperature, so that the hydraulic oil return flow decreases as the viscosity increases.

Therefore, when the viscosity of hydraulic oil is high, or in other words when the motor 15 undergoes a high load, the hydraulic oil return pump 13 that is driven by the motor 15 has a reduced number of revolutions, thereby saving power to be consumed for the drive of motor 15.

On the other hand, when the viscosity of hydraulic oil is high, the static pressure bearing 1 has a reduced flow rate of hydraulic oil effluent therefrom, with a corresponding reduction in flow rate of hydraulic oil pumped from the hydraulic oil supply source reservoir 5. The supply source reservoir 5 is thus controlled to have a level of hydraulic oil therein suppressed of variation, in cooperation with the hydraulic oil return pump 13 which serves, when the hydraulic oil has an increased viscosity, for having a reduced number of revolutions to decrease the flow rate of hydraulic oil returning from the collection reservoir 11 to the supply source reservoir 5. Therefore, it is avoidable for the supply source reservoir 5 to have a large or unnecessary quantity of low-temperature hydraulic oil inflowing thereto. As a result, in the reservoir 5, temperature variation is suppressed.

As described, the imposed voltage to the motor 15 is controlled in response to oil temperature, which control however is restricted within a range between a highest or maximum level Lmax and a lowest or minimum level Lmin in terms of a liquid level L of hydraulic oil in the supply source reservoir 5 that is detected by a level sensor 39. If the liquid level L ascends to the maximum level Lmax, then the motor 15 is controlled with a decreased voltage imposed thereon or to stop running, irrespective of the oil temperature. To the contrary, if the liquid level L descends to the minimum level Lmin, the voltage imposed on the motor 15 is increased irrespective of the oil temperature.

Accordingly, the liquid level L of hydraulic oil in the supply source reservoir 5 is held within the range between maximum level Lmax and minimum level Lmin, so that the hydraulic oil in the supply source reservoir 5 is kept from overflowing outside or lacking in quantity.

Figure 2:
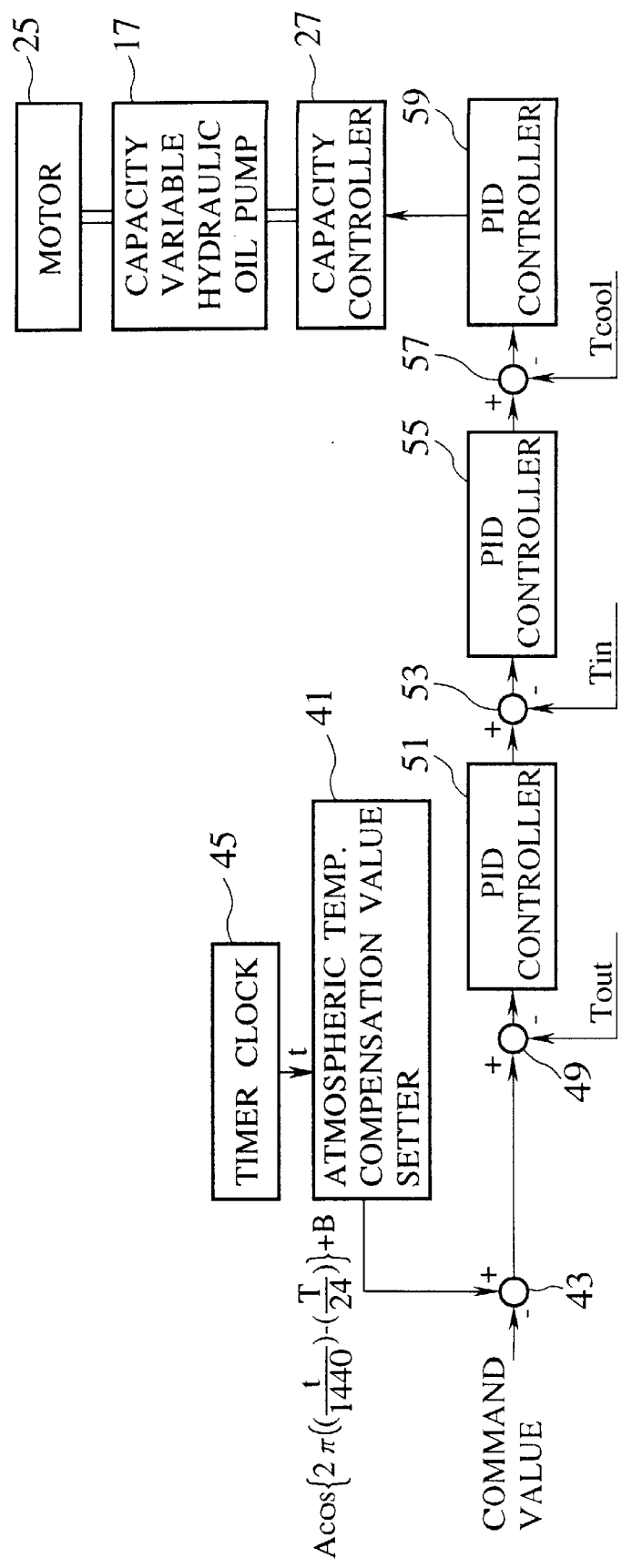
FIG. 2 is a block diagram describing control functions of the temperature control system of FIG. 1.

For the hydraulic oil supply pump 17 there is provided a delivery capacity control system, which will be described below with reference to FIG. 2. The delivery capacity control system includes an atmospheric temperature compensation or correction value setter 41 as a setting means that has an atmospheric temperature correction value set for a respective temporal section (hour in this embodiment) in response to a predicted value of an atmospheric temperature variation in a day and a delayed variation of oil temperature due to associated thermal inertia. In the control system, the correction value set by the setting means 41 is given to an addition node 43, where it compensates or corrects a command value for the temperature regulation of hydraulic oil.

This is for a feed forward compensation to be effected in respect of a variable atmospheric temperature in the day as a cyclic period.

For the setting of a time-dependent correction value of an atmospheric temperature, the setting means 41 needs data for a prediction of or information on predicted values of variations of the atmospheric temperature in a concerned day, which may be obtained by sampling actual measurement data on a varying atmospheric temperature or prepared in a manner such as employing announced information on atmospheric temperatures for temporal sections, such as by a meteorological agency. A reference delay of oil temperature variation due to thermal inertia may be set by calculation based experimental data or computed data in consideration such as of heat capacities (as quantities representative of thermal inertia) of machine body, piping, etc. The setting means 41 may thus has preset data on values for correction of atmospheric temperature in correspondence to hours, and works in synchronism with clock information to output every hour a corresponding one of temperature correction values. In addition to this function, the setting means 41 may be adapted to work with a timer measurement starting e.g. at six o'clock a.m. of a day, for a one-day operation to output a time-dependent atmospheric temperature correction value every minute, as a lapse of time is informed from a clock timer 45.

Such an atmospheric temperature correction value may be read from a data table, by an access using as a retrieval key therefor a combination of an hour and a lapse time from a start point of the timer measurement in one day. The embodiment makes use of the fact that a varying atmospheric temperature substantially describes a cosine curve in one day. More specifically, in the embodiment, a correction value to a variation of atmospheric temperature is predicted by using a cosine function that depends on time as a variable in terms of a lapse time from a start point of timer measurement in one day. Therefore, in place of a data table, there is provided a function generator for generating the cosine function e.g. as an expression representative of a mathematical model for a correction C of atmospheric temperature, such that:

$$C = A \cos[2\pi\{(t/1440)-(T/24)\}]+B,$$

where A is a half width of correction (° C.), T is a timing of correction (h), B is a bias value for correction (° C.), and t is a lapse time from six a.m. (min).

The atmospheric temperature correction value is added at the addition node 43 to the command value, to obtain a corrected command value, which is given to an addition node 49 for a looped main control, where its control target value and an oil temperature Tout detected by the outlet temperature sensor 35 (see FIG. 1) have a difference therebetween computed, which difference is input to a PID controller 51 of the main loop control.

PID is a process that responds to an output of a corresponding object of control, as it is controlled, for calculating a difference between the output and a target value, in terms of a temporal error function, applying thereto a P (proportioning), an I (integration) and a D (differentiation) process, thereby finding a characteristic of the error function, i.e., having a defined direction of evolution or convergence of errors, making use of the same to achieve a minimized error. Typically, Laplace transforms are employed for a mapping to a frequency field.

The PID controller 51 is responsible for a PID process of the input difference to generate a compensated target value of control, which is output to a subsequent stage. In the subsequent stage, the target value of main loop control from the PID controller 51 is input to an addition node 53 for an intermediate loop control, where its difference is computed relative to an oil temperature Tin detected by the input temperature sensor 33 (see FIG. 1), which difference is input to a PID controller 55 of the intermediate loop control.

The PID controller 55 is responsible for a PID process of the input difference to generate a still compensated target value of control, which is output to a subsequent stage. In this stage, the target value of intermediate loop control from the PID controller 55 is input to an addition node 57 for a minor loop control, where its difference is computed relative to an oil temperature Tcool detected by the reservoir temperature sensor 37 (see FIG. 1), which difference is input to a last-stage PID controller 59 of a JEU loop control.

The PID controller 59 is responsible for a PID process of the input difference to generate a yet compensated target value of control, which is output to the capacity controller 27.

The capacity controller 27 responds to the control target value from the last-stage PID controller 59, for controlling the delivery flow of hydraulic oil of the capacity variable hydraulic oil pump 17 so that the heat exchanger 21 has a controlled flow rate of hydraulic oil running therethrough.

As the hydraulic oil has an increased temperature relative to the target value of hydraulic oil temperature control, the hydraulic oil pump 17 is controlled to deliver an increased flow rate of hydraulic oil to the heat exchanger 21.

Figure 3A:
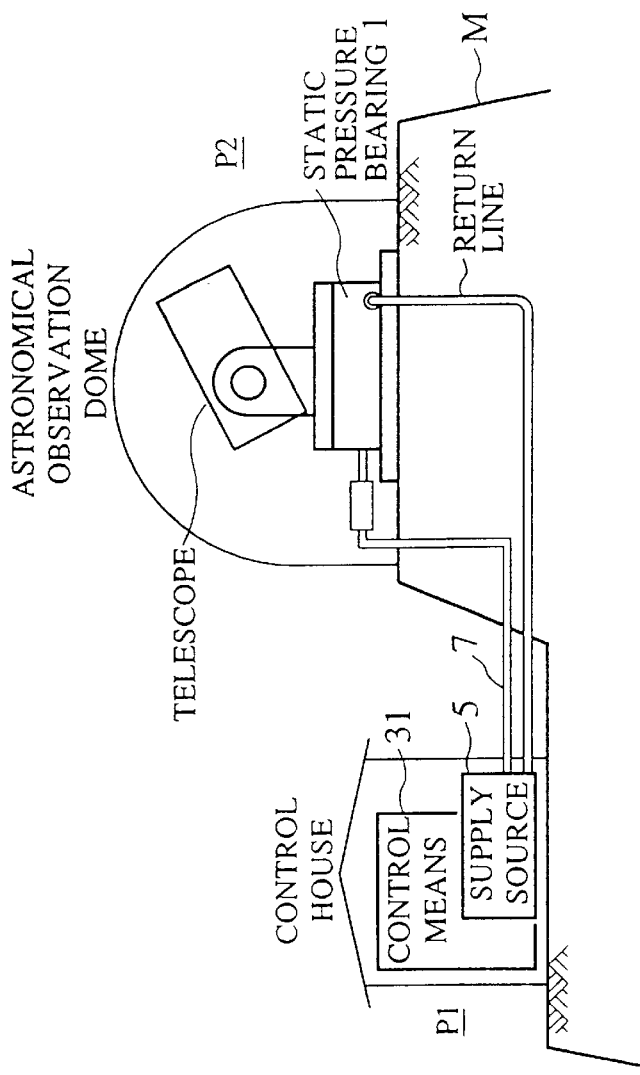
FIGS. 3A and 3B are an illustration describing principal actions of the temperature control system of FIG. 1.
Figure 3B:
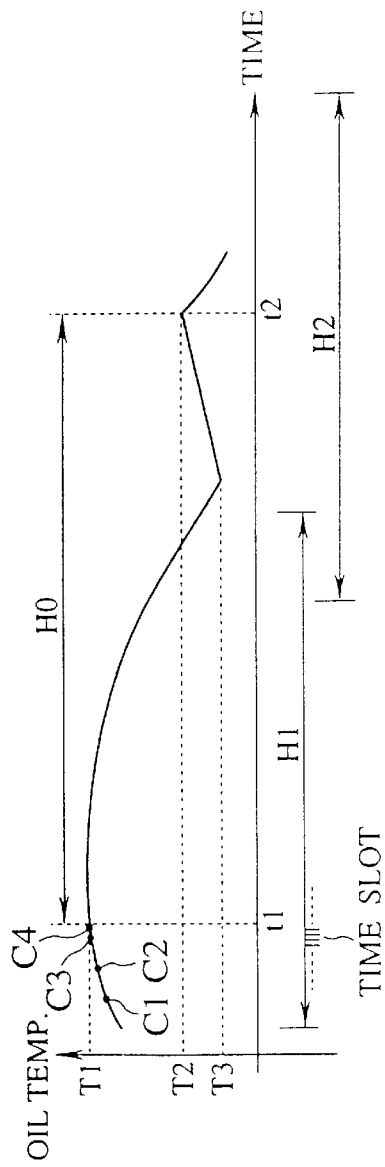

Incidentally, it will be seen that, as shown in FIG. 3, the present embodiment comprises: a supply source 5 provided at a first place P1 (e.g. hillside of a mountain M) for supplying a body of hydraulic oil with a first oil temperature T1; a piping system 7 (3, 9 inclusive) for transferring the supplied body of hydraulic oil to a second place P2 (e.g. summit of the mountain M) distant from the first place P1, taking a necessary time H0; a hydraulic device 1 (as a static pressure bearing of a large-scale astronomical telescope) provided at the second place P2 for having the transferred body of hydraulic oil working, before taking out with a second oil temperature T2 (=Tout); and control means 31 (17, 27; 19, 21, 23; 33, 35, 37, 39 may be included, as necessary) for performing a temperature control of the working body of hydraulic oil by a feed forward control. The control means 31 is operative for repeating: having a first control value C1 for a regulation of the first oil temperature T1 at a first time point t1 within a first unit time H1 to keep the working body of hydraulic oil at an adequate temperature; having an atmospheric temperature of the second place P2, as it is predicted for a second time unit H2 including a second time point t2 at which the necessary time H0 has elapsed from the first time point t1; determining a second control value C2 by compensating the first control value C1 in response to the atmospheric temperature; determining a third control value C3 by compensating the second control value C2 in response to a measurement data of the second oil temperature T2 in the first time unit H1; and performing the regulation of the first oil temperature T1 at the first time point t1 by employing the third control value C3.

It will also be seen that, as shown in FIG. 3, the hydraulic oil transferred to the second place P2 by the piping system 7 has a third oil temperature T3, and the control means 31 is adapted, in use of the third control value C3, for: determining a fourth control value C4 by compensating the third control value C3 in response to a measurement data of the third oil temperature T3 in the first time unit H1, and employing the fourth control value C4 for the temperature regulation.

Further, it will be seen that the feed forward control is performed at the first place P1.

Still more, it will be seen that the embodiment described further comprises a piping system for returning to the first place P2 a body of hydraulic oil discharged from the hydraulic device 1.

According to the embodiment, therefore, in respect of a series of dispersed, continuous or partially overlapping time units or sections, there are concerned a first time unit H1 that includes an arbitrary first time point t1 and a second time unit H2 that includes a second time point t2 having elapsed a necessary time H0 from the first time point t1. Then, to effect a regulation at the first time point t1 with respect to a temperature T1 of a body of hydraulic oil to be supplied to a first place P1, there is set a first control value C1. Note that the control value C1 represents an absolute magnitude (see FIG. 3) of oil temperature that equals a current reference temperature plus the command value for variation control (in FIG. 2). The first control value C1 is compensated in accordance with a predicted value of an absolute atmospheric temperature in the second time unit H2 at a second place P2 distant from the first place P1, to provide a second control value C2.

Accordingly, each time unit may have a narrowed width in correspondence to an average speed of change in atmospheric temperature at the second place P2, for a direct use of the second control value C2 to effect the regulation of oil temperature, so that a body of hydraulic oil regulated at least to a temperature substantially copable with an atmospheric temperature variation at the second place may be effectively used in the second place P2 by the second time point t2 at the latest.

Further, a body of hydraulic oil used in the second place P2 has its temperatures measured at voluntary time points in a repeated occurrence of the first time unit H1 to provide a set of measured data, of which a processable subset is processed till a first time point t1 in that occurrence of the first time unit H1, with a resultant data, by which the second control value C2 is compensated to provide a third control value C3, which is employed in an applicable manner to perform the regulation of oil temperature at the first time point t1.

Such a processing is executed in a repetitive manner, e.g. every one of time slots (see FIG. 3) having a very small width in comparison with the time unit. Accordingly, at a second time point t2 in a repeated occurrence of the second time unit H2, the temperature control has a converged state, covering an actual total of influences due to thermal inertia of associated equipment.

Moreover, according to the embodiment, a feed forward control is performed for a cyclic one-day period against a varying atmospheric temperature by way of a cascade control, so that a difference in feedback compensation is always minimized, permitting a body of hydraulic oil in the static pressure bearing 1 to be kept at an adequate working temperature with a high accuracy even when the hydraulic oil is subjected to a severe influence of atmospheric temperature variation and/or if the equipment has large thermal inertia.

In particular, in a temporal zone between mid night and early morning where the atmospheric temperature progressively goes down, it is avoidable for the oil temperature Tout (at an outlet of the bearing 1) to be shifted at a higher level than a target value of control, permitting a substantial match therebetween, allowing the temperature of hydraulic oil to be kept adequate (at the control target) with a high accuracy.

Incidentally, it will be understood that all or any of the PID controllers 51, 55 and 59 may be replaced by a PI (proportioning and integration) or simple P (proportioning) type controller.

Further, the intermediate loop control and the minor loop control may be either or both eliminated, if the circumstances permit a moderate accuracy.

While preferred embodiments of the present invention have been described using specific terms, such description is for illustrative purposes, and it is to be understood that changes and variations may be made without departing from the spirit or scope of the following claims.

What is claimed is:

1. A control method of a temperature of hydraulic oil, comprising the steps of:

setting a correction value C of an atmospheric temperature for a respective temporal section in response to a predicted value of a variation of the atmospheric temperature in a day and a delayed variation of said temperature of the hydraulic oil due to thermal inertia, wherein the correction value C is calculated by using a trigonometric function with respect to time as a variable such that $$C=A \cos [2\pi\{(t/t_p)-(T/T_p)\}]+B$$

where A is a half width of correction, T is a timing of correction, $T_p$ is a time period regarding T, B is a bias value for correction, t is a lapse of time, and $t_p$ is a time period regarding t; and correcting a command value for a temperature regulation of the hydraulic oil at a supply source of the hydraulic oil by the correction value C of the atmospheric temperature, performing a feed forward compensation with respect to the variation of the atmospheric temperature for the day as a cyclic period.

2. A control system of a temperature of hydraulic oil, comprising:

a temperature regulator for performing a temperature regulation of the hydraulic oil at a supply source of the hydraulic oil;

atmospheric temperature setting means for setting a correction value C of an atmospheric temperature for a respective temporal section in response to a predicted value of a variation of the atmospheric temperature in a day and a delayed variation of said temperature of the hydraulic oil due to thermal inertia wherein the correction value C is calculated by using a trigonometric function with respect to time as a variable such that $$C=A \cos [2\pi\{(t/t_p)-(T/T_p)\}]+B$$

where A is a half width of correction, T is a timing of correction, $T_p$ is a time period regarding T, B is a bias value for correction, t is a lapse of time, and $t_p$ is a time period regarding t; and oil temperature regulation control means for controlling a state of the temperature regulation by the temperature regulator such that a command value for the temperature regulation of the hydraulic oil is corrected by the correction value C of the atmospheric temperature set by the atmospheric temperature setting means, and the hydraulic oil has a temperature regulated to the corrected command value.

3. A control system according to claim 2, wherein:

the oil temperature regulator comprises a heat exchanger of a forced circulation type in which the hydraulic oil to be temperature-regulated is supplied by a hydraulic oil supply pump from a reservoir of the supply source of the hydraulic oil, and coolant is supplied by a coolant supply pump; and the oil temperature regulation control means controls a state of the temperature regulation by the heat exchanger by controlling a flow rate of the hydraulic oil to be supplied to the heat exchanger in response to the command value.

4. A control system according to claim 2 or 3, further comprising:

a collecting reservoir for collecting the hydraulic oil, as it is discharged from a hydraulic device, where it has been used;

a hydraulic oil return pump for returning the hydraulic oil from the collecting reservoir to the supply source of the hydraulic oil;

a temperature sensor for detecting an oil temperature of the hydraulic oil; and hydraulic oil return flow control means for controlling the hydraulic oil return pump to a reduced number of revolutions in response to a reduction of the oil temperature detected by the temperature sensor.

5. A temperature control method of hydraulic oil, comprising:

a first step of supplying to a first place a body of the hydraulic oil with a first oil temperature;

a second step of performing within a necessary time the steps of:

transferring the supplied body of the hydraulic oil to a second place distant from the first place; and having the transferred body of the hydraulic oil working, before taking out with a second oil temperature; and a third step of performing a temperature control of the working body of the hydraulic oil by a feed forward control in parallel with the first and the second step, the third step comprising repeating the steps of:

having a first control value for a regulation of the first oil temperature at a first time point within a first unit time to keep the working body of the hydraulic oil at an adequate temperature;

having an atmospheric temperature of the second place, as it is predicted for a second time unit including a second time point at which the necessary time has elapsed from the first time point;

determining a second control value by compensating the first control value in response to the atmospheric temperature wherein the second control value is a correction value C calculated by using a trigonometric function with respect to time as a variable such that $$C=A \cos [2\pi\{(t/t_p)-(T/T_p)\}]+B$$

where A is a half width of correction, T is a timing of correction, $T_p$ is a time period regarding T, B is a bias value for correction, t is a lapse of time, and $t_p$ is a time period regarding t;

determining a third control value by compensating the second control value in response to a measurement data of the second oil temperature in the first time unit; and performing the regulation of the first oil temperature at the first time point by employing the third control value.

6. A temperature control method according to claim 5, wherein:
the hydraulic oil transferred to the second place in the second step has a third oil temperature; and
said employing the third control value in the third step includes:
determining a fourth control value by compensating the third control value in response to a measurement data of the third oil temperature in the first time unit; and
employing the fourth control value.

7. A temperature control method according to claim 5, wherein the feed forward control is performed at the first place.

8. A temperature control method according to claim 5, further comprising a fourth step of returning to the first place a body of the hydraulic oil taken out with the second oil temperature.

9. A temperature control system of hydraulic oil, comprising:
a supply source provided at a first place for supplying a body of the hydraulic oil with a first oil temperature;
a piping system for transferring the supplied body of the hydraulic oil to a second place distant from the first place;
a hydraulic device provided at the second place for having the transferred body of the hydraulic oil working, before taking out with a second oil temperature; and
control means for performing a temperature control of the working body of the hydraulic oil by a feed forward control,
the control means being operative for repeating:
having a first control value for a regulation of the first oil temperature at a first time point within a first unit time to keep the working body of the hydraulic oil at an adequate temperature;
having an atmospheric temperature of the second place, as it is predicted for a second time unit including a second time point at which the necessary time has elapsed from the first time point;
determining a second control value by compensating the first control value in response to the atmospheric temperature wherein the second control value is a correction value C calculated by using a trigonometric function with respect to time as a variable such that $$C = A \cos[2\pi\{(t/t_p) - (T/T_p)\}] + B$$

where A is a half width of correction, T is a timing of correction, $T_p$ is a time period regarding T, B is a bias value for correction, t is a lapse of time, and $t_p$ is a time period regarding t;
determining a third control value by compensating the second control value in response to a measurement data of the second oil temperature in the first time unit; and
performing the regulation of the first oil temperature at the first time point by employing the third control value.

10. A temperature control system according to claim 9, wherein:
the hydraulic oil transferred to the second place by the piping system has a third oil temperature; and
said employing the third control value by the control means includes:
determining a fourth control value by compensating the third control value in response to a measurement data of the third oil temperature in the first time unit; and
employing the fourth control value.

11. A temperature control system according to claim 9, wherein the feed forward control is performed at the first place.

12. A temperature control system according to claim 9, further comprising a piping system for returning to the first place a body of the hydraulic oil discharged from the hydraulic device.

13. A control method according to claim 1 wherein the value of $T_p$ is 24 and the value of $t_p$ is 1440.

14. A control method according to claim 2 wherein the value of $T_p$ is 24 and the value of $t_p$ is 1440.

15. A control method according to claim 5 wherein the value of $T_p$ is 24 and the value of $t_p$ is 1440.

16. A control method according to claim 9 wherein the value of $T_p$ is 24 and the value of $t_p$ is 1440.

* * * * *